(12) United States Patent
Quemin et al.

(10) Patent No.: US 8,153,206 B2
(45) Date of Patent: Apr. 10, 2012

(54) ANTI-SOIL SILICONE VARNISH COMPOSITIONS AND SUPPORT SUBSTRATES TREATED THEREWITH

(75) Inventors: Marilyne Quemin, Lyons (FR); Laurent Dumont, La Motte Servolex (FR); Francis Lafaysse, Lyons (FR)

(73) Assignee: Bluestar Silicones France SAS, Lyon Cedex ( * ) Notice: Subject to any disclaimer, the term of this patent is extended or adjusted under 35 U.S.C. 154(b) by 63 days.

(21) Appl. No.: 12/068,453

(22) Filed: Feb. 6, 2008

(65) Prior Publication Data
US 2008/0311810 A1 Dec. 18, 2008

Related U.S. Application Data

(63) Continuation of application No. 11/166,218, filed on Jun. 27, 2005, now abandoned, and a continuation of application No. PCT/FR03/03616, filed on Dec. 8, 2003.

(30) Foreign Application Priority Data

Dec. 26, 2002 (FR) ...................................... 02 16710

(51) Int. Cl.
*C08J 7/18* (2006.01)
(52) U.S. Cl. ................... 427/515; 427/387; 106/287.15; 428/447
(58) Field of Classification Search ............. 106/287.15; 428/447; 427/387, 515
See application file for complete search history.

(56) References Cited

U.S. PATENT DOCUMENTS

| | | | |
|---|---|---|---|
| 4,211,823 A * | 7/1980 | Suzuki et al. ................. | 428/412 |
| 4,362,179 A | 12/1982 | MacPhee et al. | |
| 5,213,617 A * | 5/1993 | Blizzard .................. | 106/287.13 |
| 5,658,674 A | 8/1997 | Lorenzetti et al. | |
| 5,973,067 A * | 10/1999 | Nakamura et al. ............. | 524/858 |
| 6,432,191 B2 | 8/2002 | Schutt | |
| 6,599,628 B1 * | 7/2003 | Finsterwalder et al. ...... | 428/421 |
| 7,485,421 B2 * | 2/2009 | Uhlmann et al. ................. | 435/6 |
| 2001/0030038 A1 | 10/2001 | Schutt et al. | |

FOREIGN PATENT DOCUMENTS

| | | |
|---|---|---|
| EP | 0718432 A | 6/1996 |
| FR | 2 719 598 A | 11/1995 |
| JP | 2000 053916 A | 2/2000 |
| WO | WO 01/58972 A | 8/2001 |

OTHER PUBLICATIONS

Viscosity Conversion Table, Norcross Corporation, www.viscosity.com, 2007.
BYK Additives and Instruments, "Viscosity" brochure from www.byk.com/instruments/viscosity, 2007.

* cited by examiner

Primary Examiner — Margaret Moore
(74) Attorney, Agent, or Firm — SNR Denton US LLP

(57) ABSTRACT

Silicone compositions, particularly for the production of anti-fouling varnishes which may be applied to flexible or bulk supports to provide an anti-fouling silicone varnish for textiles coated with elastomeric silicones which is economical, adhesive, low-slip and glossy; these are crosslinked silicone compositions comprising: A. at least one alkenylsilane, B. at least one catalytic system which comprises: B/1 at least one organometallic condensation catalyst, B/2 at least one metal M chelate and/or one metal alkoxide of general formula $M(OJ)_n$, wherein n=valence of M and J=linear or branched $C_1$-$C_8$ alkyl radical, M being selected from among: Ti, Zr, Ge and Al, C. at least one ultrafine filler, D. optionally, at least one arylsilane other than A. E. optionally, at least one other silane other than A. and other than D., F. optionally, at least one thickening agent and G. optionally, at least one functional additive.

16 Claims, 1 Drawing Sheet

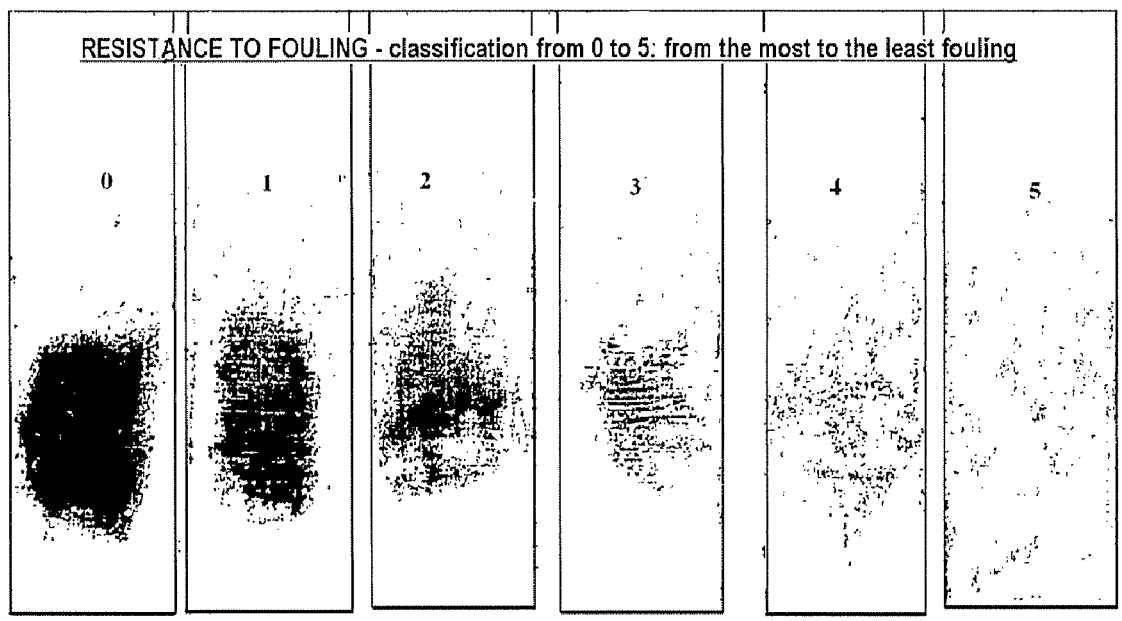

ANTI-SOIL SILICONE VARNISH COMPOSITIONS AND SUPPORT SUBSTRATES TREATED THEREWITH

CROSS-REFERENCE TO PRIORITY APPLICATIONS

This application is a continuation of earlier U.S. patent application Ser. No. 11/166,218, filed Jun. 27, 2005, now abandoned, and claims priority under 35 U.S.C. §119 of FR 0216710, filed Dec. 26, 2002, and is a continuation/national phase of PCT/FR03/003616, filed Dec. 8, 2003 and designating the United States (published in the French language on Aug. 12, 2004, as WO 2004/067613 A1; the title and abstract were also published in English), each hereby expressly incorporated by reference in its entirety and each assigned to the assignee hereof.

CROSS-REFERENCE TO COMPANION APPLICATION

Our application Ser. No. 11/166,380, filed concurrently herewith and also assigned to the assignee hereof. This application issued as U.S. Pat. No. 7,790,785.

BACKGROUND OF THE INVENTION

1. Technical Field of the Invention

The present invention relates to polymer coatings or varnishes capable of conferring resistance to soiling on supports which may be at least partially composed of silicone.

The support substrates concerned are various and can, in particular, be composed:

of flexible supports, in particular fibrous supports, which may or may not be woven, coated with at least one layer for mechanical strengthening or protection based on the coating polymer, for example of the silicone elastomer type;

of supports in the massive form made of silicone and/or coated with one or more silicone layers, for example components made of metal, of plastic or ceramic (composite components, such as electrical insulators, e.g.,);

or else of polymer or elastomer supports, in particular plastic films, such as, for example, protective packaging films.

The present invention also relates to processes for the application to various supports of an anti-soil varnish.

Too, this invention relates to supports coated with such anti-soil varnishes and in particular flexible supports, such as textile cloths optionally coated with a layer of silicone elastomer, the anti-soil varnish being applied to the layer of silicone elastomer, such cloths being useful for the manufacture:

1. of architectural textiles (components of textile architecture);

2. or else of flexible supports other than architectural textiles.

As regards the field of application 1., it should be appreciated that, throughout the present account and within the meaning of the present invention, the term "architectural textile" means a woven fabric or nonwoven fabric and more generally the fibrous support intended, after coating, for the preparation:

of shelters, of mobile structures, of textile constructions, of partitions, of flexible doors, of tarpaulins, of tents, of stands or of marquees;

of furniture, of cladding, of advertising displays, of windbreaks or of filter panels;

of solar protection devices, of ceilings and of blinds.

As regards the field of application 2., it will be appreciated that these flexible supports other than architectural textiles can, for example, be those intended for the manufacture, of in particular:

airbags used for the protection of the occupants of a vehicle, glass braids (woven glass sheaths for thermal and dielectric protection for electrical wires), conveyor belts, fire barrier fabrics or thermal insulation fabrics, clothes, compensators (flexible sealing sleeves for pipe work).

Silicone elastomer coatings on textile supports, due to the intrinsic properties of silicones, already impart numerous advantages on the composites thus formed, namely, inter alia:

flexibility, mechanical strength, thermal stability, release properties, and longevity.

However, in the field of textile architecture, which constitutes an important application for the above said composites, other requirements have been formulated, which are in particular the following:

resistance to soiling substances, good characteristics with regard to appearance, especially with respect to the coloring and the gloss, ability to adhesively bond, to make it possible to easily assemble the composites two by two, low sliding coefficient in order to favor the handling of the composite, good cohesion of the composite.

These properties can be provided by an appropriate surface coating. The general problem and the basis of the invention is thus the development of a silicone varnish capable of fulfilling this role, in particular as regards the anti-soil properties.

However, before satisfying the requirements relating to the final applications targeted for the composite, it is important for this varnish to furthermore meet upstream specifications, namely, in particular:

to be able to be easily spread over a silicone layer, indeed even a nonsilicone layer (for example polyvinyl chloride, polyurethane or polyamide), to adhere perfectly to this silicone or nonsilicone layer, and more generally to be easy and economical to employ industrially.

2. Description of Background and/or Related and/or Prior Art

WO-A-00/59992 discloses silicone compositions for use in particular for the preparation of varnishes which can be applied to supports for which it is desired to reduce the coefficient of friction. One of these compositions comprises at least one polyorganosiloxane A (POS) which can be crosslinked via crosslinking functional groups (CFGs) by the cationic and/or radical route and an initiator C selected from among onium borates, wherein it additionally comprises POS D molecules substituted by secondary functional groups (SFGs) carried by silicon atoms and selected from those comprising at least one alkoxy and/or epoxy and/or carboxyl unit, and optionally a filler (e.g., silica).

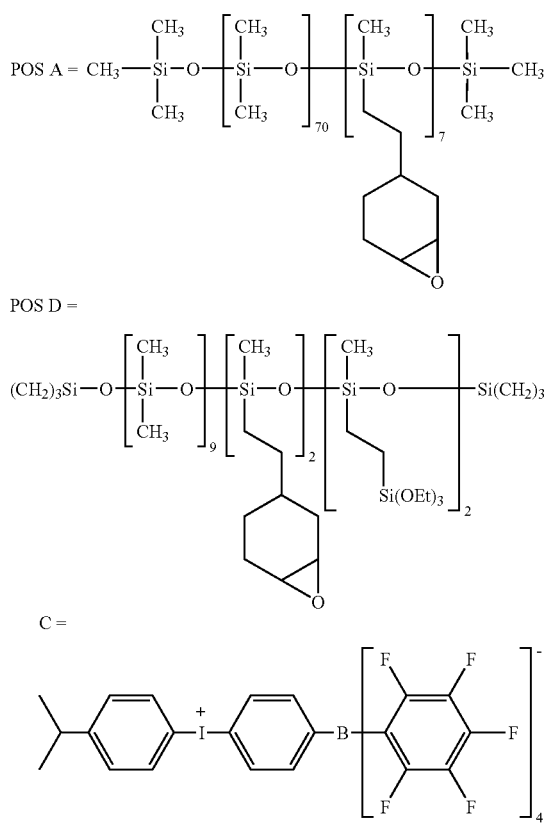

These compositions can additionally comprise fillers and in particular siliceous fillers, which can, for example, be:

combustion or pyrogenic silicas treated with hexamethyldisilazane or with octamethylcyclotetrasiloxane (specific surface up to approximately 300 m²/g), fumed silicas, ground synthetic or natural fibers (polymers), calcium carbonates, talc, clays, titanium dioxides, and the like.

Such compositions are used as anti-soil varnishes for RTV silicone coatings of fabrics for air bags, for thermal transfer ribbons or for packaging films.

Such varnishes are not the most effective in terms of anti-soil properties and can be improved in terms of sliding coefficient. In addition, they require the use of specific silicones which can be crosslinked by cationic routes under UV activation, which leaves a margin for improvement economically and with regard to simplifying the means employed.

It is thus apparent that the prior art is essentially devoid of anti-soil varnishes compatible with coatings, in particular silicone elastomer coatings, for supports, in particular textile supports, and even less in anti-soil varnishes which meet the above specifications.

SUMMARY OF THE INVENTION

Novel anti-soil varnish compositions for various supports have now been developed, optionally silicone supports, in particular flexible supports (textiles), especially those coated with silicone elastomers, or supports in the massive form made of silicone elastomer, such varnish compositions having the quality of having good resistance to soiling, of being economical, of being fully attached to the support and in particular to the coated elastomer layer and of introducing the desired low surface slip, as well as a sufficiently glossy appearance.

Another aspect of the present invention is the provision of an anti-soil varnish which can be easily applied to various types of supports.

Another aspect of the invention is the provision of an anti-soil varnish which can be crosslinked, which is easy to employ and which is economical.

Another aspect of the present invention is the provision of a varnish composition based on silyl-comprising entities compatible with silicone elastomers and useful, in particular, in the preparation of anti-soil varnishes, these compositions having a reasonable price and being simple to prepare.

Another aspect of the invention is the provision of a process for the simple and economical varnishing of various silicone-comprising supports or silicones formed, for example, by woven or nonwoven fibrous substrates coated with a layer of crosslinked silicone elastomer or by supports in the massive form at least partially composed of silicone, using anti-soil varnish based on silyl-comprising entities compatible with the silicone elastomers.

Another aspect of the invention is the provision of a composite comprising a support coated with at least one layer of elastomer and covered with a silicone varnish as defined above, for example a cloth (architectural textile) coated with crosslinked silicone elastomer, with high resistance to soiling substances.

Thus, to satisfy the above objectives, the present invention first features crosslinkable silyl-comprising varnishes having, in particular, anti-soil properties and comprising:

A. at least one alkenylsilane;
B. at least one catalytic system comprising:
    B/1 at least one organometallic condensation catalyst;
    B/2 at least one metal M chelate and/or one metal alkoxide of general formula $M(OJ)_n$, wherein n=valence of M and J=linear or branched $C_1$-$C_8$ alkyl, M being selected from the group consisting of: Ti, Zr, Ge and Al;
C. at least one ultrafine filler;
D. optionally, at least one arylsilane other than A;
E. optionally, at least one other silane other than A and than D;
F. optionally, at least one thickening agent;
G. optionally, at least one functional additive.

BRIEF DESCRIPTION OF THE DRAWINGS

FIG. 1 shows the standard used in the soiling test for the inventive coating.

DETAILED DESCRIPTION OF BEST MODE AND SPECIFIC/PREFERRED EMBODIMENTS OF THE INVENTION

The silicone varnishes according to the invention are advantageous in that they make it possible to very greatly increase the resistance to soiling while having a glossy appearance and a low sliding coefficient.

The mechanical qualities and the usual properties of the supports coated using the composition according to the invention are not affected.

In addition, this varnish composition has a stability sufficient for use delayed with respect to its manufacture by a storage tank compatible with marketing criteria.

The combination of components A, B and C, and optionally D and/or E and/or F and/or G provide exceptional results. This is because it could not have been predicted that this combination of carefully selected components could contribute all of the advantageous results above indicated.

The term "alkenyl" means a substituted or unsubstituted, unsaturated, linear or branched, hydrocarbon chain having at least one olefinic double bond and more preferably a single double bond. Preferably, the "alkenyl" group has from 2 to 8 carbon atoms, better still from 2 to 6. This hydrocarbon chain optionally comprises at least one heteroatom, such as O, N or S.

Preferred examples of "alkenyl" groups are the vinyl, allyl and homoallyl groups, vinyl being particularly preferred.

The term "alkyl" denotes an optionally substituted (e.g., by one or more alkyls), saturated, cyclic, linear or branched, hydrocarbon chain preferably of 1 to 10 carbon atoms, for example of 1 to 8 carbon atoms, better still of 1 to 4 carbon atoms.

Examples of alkyl radicals are in particular methyl, ethyl, isopropyl, n-propyl, tert-butyl, isobutyl, n-butyl, n-pentyl, isoamyl and 1,1-dimethylpropyl.

The "alkyl" moiety of the "alkoxy" radical is as defined above.

The "alkyl" can be perfluorinated and the term "perfluorinated alkyl" denotes an alkyl comprising at least one perfluoroalkyl group, preferably having the formula:

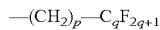
$$-(CH_2)_p-C_qF_{2q+1}$$

in which p represents 0, 1, 2, 3 or 4, q is an integer from 1 to 10 and $C_qF_{2q+1}$ is linear or branched. Preferred examples of this radical are: $-(CH_2)_2-(CF_2)_5-CF_3$ and $-(CF_2)_7-CF_3$.

The term "alkylene" denotes an optionally substituted (e.g., by one or more alkyls), saturated, cyclic, linear or branched, divalent hydrocarbon chain preferably of 1 to 10 carbon atoms, for example of 1 to 8 carbon atoms, better still of 1 to 4 carbon atoms.

The expression "aryl" denotes a monocyclic or polycyclic, and preferably monocyclic or bicyclic, aromatic hydrocarbon group having from 6 to 18 carbon atoms. It should be understood that, in the context of the invention, the term "polycyclic aromatic radical" means a radical having two or more aromatic nuclei fused (ortho-fused or ortho- and peri-fused) to one another, that is to say having, in pairs, at least two carbons in common.

Mention may be made, as an example of "aryl", of phenyl radicals.

In accordance with the invention, preferred alkenylsilanes A are selected from the group of products consisting of:

1. the monomers selected from among organoalkenylsilanes comprising, per molecule, at least one alkenyl group, preferably from alkoxylated organoalkenylsilanes and more preferably still from the products of the following general formula:

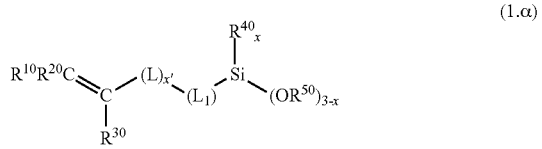

(1.α)

in which:
$R^{10}$, $R^{20}$ and $R^{30}$ are each hydrogen or hydrocarbon radicals which are identical or different from one another and preferably represent hydrogen, an alkyl or a phenyl radical optionally substituted by at least one alkyl radical,
L is an alkylene radical,
$L_1$ is a valency bond or oxygen,
$R^{40}$ and $R^{50}$ are identical or different radicals and are each an alkyl radical,
x'=0 or 1,
x=0 to 2, preferably 0 or 1 and more preferably still 0;

2. the oligomers (or condensates) of monomer(s) 1.;
3. the hydrolyzates obtained from monomer(s) 1.;
4. and mixtures thereof.

According to a first preferred characteristic of the invention, the monomers A1. are selected from the subgroup consisting of vinyl- or allylalkoxysilanes and (meth)acryloyloxy(alkoxy)silanes, such as vinyltrialkoxysilanes and methacrylolyoxypropyltrialkoxy-silanes, vinyltrimethoxysilane (VTMO) being particularly appropriate.

According to a second preferred embodiment of the invention, the oligomers (of condensates) A2. are selected from the group consisting of those obtained from the monomers A1. and preferably from vinyltrimethoxysilane (VTMO) or from vinyltriethoxysilane (VTEO).

Mention may be made, as examples of oligomers (or condensates) A2., of oligomeric vinylsilanes of the type of those sold by Degussa under the registered trademark Dynasilan® 6490, 6498 or 6598 or else oligomeric methacryloyloxysilanes, such as Dynasilan® 5821 and Dynasilan® 5823.

According to a third preferred embodiment of the invention, the hydrolyzate A3. comprises a mixture of at least one monomer A1. with acidic aqueous solution, the water/alkenylsilane monomer A1. molar ratio being less than or equal to 1.5, preferably less than or equal to 1.2, and more preferably still between 0.8 and 1.1.

In practice, the acidification of the medium comprising the hydrolyzate A3. is such that the pH is, for example, between 2 and 4, preferably in the region of 2.5.

Advantageously, this acidic aqueous solution comprises at least one acid preferably selected from the acids corresponding to the group consisting of: HCl, $H_3PO_4$, $CH_3COOH$ and their mixtures.

When it is present, the organometallic condensation catalyst B/1 is preferably a catalytic tin compound, generally an organotin salt, preferably introduced in the form of an aqueous emulsion. The organotin salts which can be used are described in particular in the text by Noll, *Chemistry and Technology of Silicones*, Academic Press, (1968), page 337.

Use may also be made, as catalytic tin compound, either of distannoxanes or of polyorganostannoxanes or of the reaction product of a tin salt, in particular of a tin dicarboxylate, with ethyl polysilicate, as disclosed in U.S. Pat. No. 3,862,919.

The reaction product of an alkyl silicate or of an alkyltrialkoxysilane with dibutyltin diacetate, as disclosed in BE-A-842,305, may also be suitable.

According to another possibility, recourse may be had to the tin(II) salt, such as $SnCl_2$ or stannous octoate.

The preferred tin salts are tin bischelates (EP-A-147,323 and EP-A-235,049), diorganotin dicarboxylates and in particular dibutyl- or dioctyltin diversatates (GB-A-1-289,900), dibutyl- or dioctyltin diacetate, dibutyl- or dioctyltin dilaurates or the hydrolyzis products of the above-mentioned integers (e.g., diorgano- and polystannoxanes).

This catalyst B/1 can also be selected from among the carboxylic acid salts and the halides of metals other than B/2, such as, for example, lead, zinc, zirconium, titanium, iron, barium, calcium and manganese.

Use is made of 0.01 to 3, preferably of 0.05 to 2, parts of salt B/1 per 100 parts of the silanes of the composition.

As regards other component B/2 of the catalytic system B, the preferred products are those in which the metal M is selected from the following list: Ti, Zr, Ge, Li and Mn. It should be emphasized that titanium is more particularly preferred. It can be combined, for example, with an alkyl radical of butyl type.

The varnishes according to the invention additionally comprise at least one ultrafine filler C. which may or may not be siliceous.

This ultrafine filler C is selected from inorganic fillers having a mean particle diameter φme in the region of, preferably less than or equal to, 0.5 μm, advantageously less than or equal to or in the region of 0.1 μm; preferably from:

siliceous fillers belonging to the group of silica powders (colloidal silicas, combustion and precipitated silicas, or their mixtures), nanometric fillers presented as suspensions, such as, for example, colloidal silica suspensions, other inorganic fillers selected from the group consisting, inter alia, of: $TiO_2$, $Al_2O_3$ (aluminum hydrate) and mica, or their mixtures.

It may be advantageous to employ, in accordance with the invention, at least one arylsilane D preferably selected from phenylsilanes and more preferably still from the group consisting of phenyltrialkoxysilanes, phenylalkyldialkoxysilanes and their mixtures.

According to another advantageous alternative embodiment, the varnish composition according to the invention comprises one or more other silanes E other than the silanes A and D. These silanes E, when they are functionalized, comprise, per molecule, one or more functional groups which are identical to or different from one another and which are selected from the group consisting of the following functional groups: hydroxyl, amino (primary, secondary or tertiary amine, optionally included in a ring or in isocyanurate groups or HALS groups of the piperidine or other type), epoxy, (meth)acrylo and ureido. Nonfunctionalized silanes are another option.

Mention may be made, as examples of other silanes E, of glycidoxypropyltrialkoxysilanes, epoxycyclohexylethyltrialkoxysilanes, aminopropyltrialkoxysilanes, aminoethylaminopropyltrialkoxysilanes, ethyl silicate, methyltrimethoxysilane or methyltriethoxysilane.

The preferred varnish composition is of the type of those which can be crosslinked by polycondensation and comprises:

A. 100 parts by weight of alkenylsilane;
B. 0.1 to 10 parts by weight of a catalytic system including from 0 to 80% by weight, preferably from 5 to 60% by weight, of organometallic condensation catalyst B/1;
C. 2 to 50 parts by weight of ultrafine filler;
D. 0 to 30 parts by weight of at least one arylsilane;
E. 0 to 30 parts by weight of at least one other silane other than A and D;
F. 0 to 5 parts by weight of at least one thickening agent;
G. 0 to 5 parts by weight of at least one functional additive.

The viscosity of the noncrosslinked liquid varnish as applied to the support is an important parameter of the invention. Thus, the dynamic viscosity η (expressed in mPa·s at 25° C.) of the A, B and C, optionally D and/or E and/or F and/or G, varnish is such that:

|  |  |
|---|---|
|  | $2 \leq \eta \leq 500$ |
| preferably | $5 \leq \eta \leq 200$ |
| and more preferably still | $10 \leq \eta \leq 150$. |

The dynamic viscosity η at 25° C. can be measured via the well known trade test referred to as the Ford cup No. 4 test, which entails measuring the flow time in seconds of a given amount of the product through a given orifice. This flow time is converted to a kinematic viscosity in centistokes using a Ford cup calibration curve well known to one skilled in the art and given in particular in a technical flow commercial brochure from Byk Gardner, p. 152, which company is a supplier of the Ford cup measuring equipment.

Details with regard to the nature of the various constituents of the silicone varnish composition according to the invention include:

| | |
|---|---|
| A1. = | VTMO; |
| A2. = | VTMO oligomers; |
| A3. = | VTMO hydrolyzate; |
| B1. = | tin salt (e.g., dibutyltin diacetate); |
| B2. = | TetraButOxyTitanium (TBOT); |
| C. = | treated or untreated pyrogenic silica; |
| D. = | phenyltrimethoxysilane; |
| E. = | other silane ≠ A ≠ D = for example, ethyl silicate; |
| F. = | wax(es) based on micronized polyamide. |

The varnishes according to the invention can comprise functional additives G. They can be covering products, such as, for example, pigments/dyes (G.1), stabilizing agents (G.2), in particular with regard to UV radiation, or diluents {solvents} (G.3).

According to an advantageous embodiment of the invention, the varnish is provided in the form of a single-component system capable of rapidly crosslinking under hot conditions by polycondensation.

In view of its ease of preparation, its low cost and its anti-soil properties, the silicone varnishes according to the invention are capable of having outlets in numerous fields of application and in particular in the field of the coating:

of supports with a woven or nonwoven fibrous core optionally comprising silicone (i.e., coated over at least one of its faces with at least one layer of elastomer);

or else of supports composed of components in the massive form made of silicone and/or comprising silicone.

According to another of its aspects, the invention relates to a varnishing process, wherein the composition as defined above is applied, as anti-soil varnish, to the silicone surface of a support composed at least in part of silicone, preferably silicone elastomer. It can be a support at least partially coated with at least one layer of elastomer or a component made of silicone.

According to an alternative embodiment, this varnishing process is carried out on a support, the surface of which comprises at least nonsilicone (co)polymer preferably selected from the group consisting of: polyamides, polyolefins, polyesters, their blends and the copolymers.

Preferably, this process consists essentially:

in coating the support using the varnish composition A, B and C, optionally D and/or E and/or F and/or G, as defined above, and in crosslinking the layer of varnish, optionally by thermally activating the crosslinking.

According to an advantageous embodiment of the invention, the varnish composition is applied to the support according to a level of deposition of less than or equal 35 g/m², preferably of between 2 and 25 g/m².

As regards use of the varnish composition according to the invention, it can, for example, be applied to a support by any appropriate coating or transfer means (for example, doctor blade, coating roll, gravure printing, dynamic screen printing, brush, spraying: gun, and the like).

The crosslinking of the varnish liquid silicone composition applied to the support to be coated is generally activated, for example, by heating the surface of the support thus coated to a temperature of between 50 and 200° C., taking into account, very clearly, the maximum resistance of the support to heat.

The activation means are of the type of those known and appropriate for this purpose, for example thermal activation or activation by IR radiation.

Other details will be given in the examples which follow.

The above defined varnishing process can relate either to architectural textiles or to supports other than architectural textiles.

The present invention also features the varnished support (or composite), with or without the exception of the composites intended to form architectural textiles as defined above, having anti-soil properties and a low sliding coefficient which is capable of being obtained by the process as described above. This composite is characterized in that it comprises:
 a support, preferably a flexible support, more preferably still selected from the group consisting of:
  textiles,
  nonwoven fibrous supports,
  polymer films, in particular polyester, polyamide, polyolefin, polyurethane, poly(vinyl chloride) or silicone films,
 a coating integral with at least one of the faces of the support and composed of at least one layer of silicone elastomer and/or of at least one other (co)polymer,
 at least one layer of varnish as defined above.

According to an alternative embodiment, the composite capable of being obtained by the process described above can comprise:
 a support which is massive or block in form optionally made of silicone and/or at least partially coated with silicone, the silicone preferably being a silicone elastomer,
 and at least one layer of varnish as defined above.

The silicone coating is optional, for example when the support is itself silicone.

Advantageously, the support of the composite according to the invention comprises at least one material selected from the group consisting of:
 glass, in the massive form or in the form of fibers,
 ceramics, in the massive form or in the form of fibers,
 natural or synthetic polymers which are provided in the massive form, in the form of fibers or in the form of films, in particular of polyester, polyamide, polyolefin, polyurethane, poly(vinyl chloride) or silicone,
 cellulose or lignocellulose materials in the massive or fibrous form, in particular paper, board or the like,
 and their combinations.

The flexible supports to which the invention relates can be, inter alia, architectural textiles.

Thus, this invention also features an architectural textile, same comprising a composite capable of being obtained by the varnishing process described above and applied to an architectural textile, said composite comprising:
 a support, preferably a flexible support, more preferably still selected from the group consisting of:
  textiles,
  nonwoven fibrous supports,
  polymer films,
 optionally a coating integral with at least one of the faces of the support and which comprises at least one layer of silicone elastomer and of at least one other (co)polymer,
 at least one layer of varnish as defined above.

Advantageously, the support included in this architectural textile comprises at least one material selected from the group consisting of:
 glass in the form of fibers,
 ceramics in the form of fibers,
 natural or synthetic polymers which are provided in the form of fibers or in the form of films, in particular of polyester, polyamide, polyurethane, poly(vinyl chloride) or silicone,
 cellulose or lignocellulose materials in the massive or fibrous form, in particular paper, board or the like.

Other flexible supports to which the invention relates and which are different from the "architectural textiles" can be, inter alia, those intended for the manufacture of:
 airbags used for the protection of the occupants of a vehicle,
 glass braids (woven glass sheaths for thermal and dielectric protection for electrical wires),
 conveyor belts, fire barrier fabrics or thermal insulation fabrics,
 clothes,
 compensators (flexible sealing sleeves for pipe work), and the like.

According to another of its aspects, the present invention features:
 manufactured articles comprising the composite as defined above which are different from those included in the composition of architectural textiles,
 and manufactured articles comprising architectural textiles based on the composite also defined above.

The fibrous supports intended to be coated and then varnished in accordance with the invention can, for example, be woven fabrics, nonwoven fabrics or knitted fabrics or more generally any fibrous support comprising fibers selected from the group of materials consisting of: glass, silica, metals, ceramics, silicon carbide, carbon, boron, natural fibers, such as cotton, wool, hemp or flax, artificial fibers, such as viscose, or cellulose fibers, synthetic fibers, such as polyesters, polyamides, polyacrylics, chlorofibers, polyolefins, synthetic rubbers, poly(vinyl alcohol), aramids, fluorofibers, phenolics, silicones, and the like.

Mention may be made, as preferred examples of fibrous supports, of glass, polyester, polyamide, polyurethane, polyolefin, poly(vinyl chloride) or silicone fabrics or else paper, board or the like.

In addition to textile flexible supports coated with silicone, the anti-soil varnish according to the invention can be applied to plastic films (for example, protective packaging films), e.g., made of polyester, polyurethane, polyamide, polyolefin (polyethylene, polypropylene), poly(vinyl chloride) or silicone.

The present invention furthermore also features the use of a composition as defined above as anti-soil varnish on a silicone or nonsilicone surface, preferably on a silicone surface, for example for coating a fibrous support, with or without the exception of any architectural textile.

The supports which are massive or block in form to which the invention relates can, inter alia, be components selected from the group consisting of:
 furniture,
 cladding,
 advertising displays,
 windbreaks,
 compensators (flexible sealing sleeves for pipework),
 or filter panels.

Finally, the present invention features any manufactured article comprising the composite as defined above.

The silicone capable of forming the coating or the component which is massive in form to which the varnish composition according to the invention is capable of being applied can be an elastomer based on polyorganosiloxane(s) which can be crosslinked or which is at least partially crosslinked and which is preferably selected from:

polyaddition or polycondensation, RTV silicones,
and/or peroxide-cured or polyaddition HCE silicones,
and/or polyaddition LSR silicones.

The anti-soil varnish obtained from the composition as defined above is applied to the upper layer(s) of silicone elastomer.

The expressions "RTV", "LSR" and "HCE" are well known to one skilled in the art: RTV is the abbreviation for "Room Temperature Vulcanizing", LSR is the abbreviation for "Liquid Silicone Rubber" and HCE is the abbreviation for "Heat Curable Elastomer".

In practice, the invention more specifically features supports (for example textiles, such as those used for the manufacture of airbags), coated on one and/or other of their faces with a layer of RTV, HCE or LSR crosslinked silicone elastomer, itself coated with an anti-soil silicone varnish coating as defined above.

The problem of the introduction of anti-soil properties is particularly acute regarding these crosslinked silicone elastomer coatings since, as has already been indicated above, the latter have the characteristic of having a tacky feel.

The polyorganosiloxanes which are the main constituents of the tacky layers of crosslinked elastomers or of the supports/components which are massive in form on which the varnish according to the invention is capable of being applied can be linear, branched or crosslinked and can comprise hydrocarbon radicals and/or reactive groups, such as, for example, hydroxyl groups, hydrolyzable groups, alkenyl groups and hydrogen atoms. It should be noted that polyorganosiloxane compositions are fully described in the literature and in particular in the test by Walter Noll: *Chemistry and Technology of Silicones*, Academic Press, 1968, 2nd edition, pages 386 to 409.

More specifically, these polyorganosiloxanes which can be varnished are comprised of siloxyl units of general formula:

$$R^{\circ}_{n_1} SiO_{\frac{4-n_1}{2}} \quad (I')$$

and/or of siloxyl units of formula:

$$Z^{\circ}_{x_1} R^{\circ}_{y_1} SiO_{\frac{4-x_1-y_1}{2}} \quad (II')$$

in which formulae the various symbols have the following meanings:

the R° symbols, which are identical or different, each represent a group of nonhydrolyzable hydrocarbon nature, it being possible for this radical to be:

an alkyl or haloalkyl radical having from 1 to 5 carbon atoms and comprising from 1 to 6 chlorine and/or fluorine atoms, cycloalkyl and halocycloalkyl radicals having from 3 to 8 carbon atoms and comprising from 1 to 4 chlorine and/or fluorine atoms, aryl, alkylaryl and haloaryl radicals having from 6 to 8 carbon atoms and comprising from 1 to 4 chlorine and/or fluorine atoms, cyanoalkyl radicals having from 3 to 4 carbon atoms;

the Z° symbols, which are identical or different, each represent a hydrogen atom, a $C_2$-$C_6$ alkenyl group, a hydroxyl group, a hydrolyzable atom or a hydrolyzable group;

$n_1$=an integer equal to 0, 1, 2 or 3;

$x_1$=an integer equal to 0, 1, 2 or 3;

$y_1$=an integer equal to 0, 1 or 2;

the sum x+y is between 1 and 3.

Mention may be made, by way of illustration, among the R° organic radicals directly bonded to the silicon atoms, of the methyl, ethyl, propyl, isopropyl, butyl, isobutyl, n-pentyl, t-butyl, chloromethyl, dichloromethyl, α-chloroethyl, α,β-dichloroethyl, fluoromethyl, difluoromethyl, α,β-difluoroethyl, 3,3,3-trifluoropropyl, trifluorocyclopropyl, 4,4,4-trifluorobutyl, 3,3,4,4,5,5-hexafluoropentyl, β-cyanoethyl, γ-cyanopropyl, phenyl, p-chlorophenyl, m-chlorophenyl, 3,5-dichlorophenyl, trichlorophenyl, tetrachlorophenyl, o-, p- or m-tolyl, α,α,α-trifluorotolyl or xylyl, such as 2,3-dimethylphenyl or 3,4-dimethylphenyl, groups.

The R° organic radicals bonded to the silicon atoms are preferably methyl or phenyl radicals, it being possible for these radicals optionally to be halogenated, or else cyanoalkyl radicals.

The Z° symbols can be hydrogen atoms, hydrolyzable atoms, such as halogen atoms, in particular chlorine atoms, vinyl groups, hydroxyl groups or hydrolyzable groups, such as, for example, amino, amido, aminoxy, oxime, alkoxy, alkenyloxy or acyloxy.

The nature of the polyorganosiloxane and thus the ratios of the siloxyl unit (I') and (II') to one another and the distribution of the latter is, as is known, selected according to the crosslinking treatment which will be carried out on the curable (or vulcanizable) composition for the purpose of converting it to elastomer.

It is possible to use a great variety of single-component or two-component compositions which crosslink by polyaddition or polycondensation reactions in the presence of a metal catalyst and optionally of an amine and of a crosslinking agent.

Two-component or single-component polyorganosiloxane compositions which crosslink at ambient temperature (RTV) or under hot conditions (HCE) by polyaddition reactions, essentially by reaction of hydrosilyl groups with alkenylsilyl groups, in the presence of a metal catalyst, preferably a platinum catalyst, are disclosed, for example, in U.S. Pat. Nos. 3,220,972, 3,284,406, 3,436,366, 3,697,473 and 4,340,709. The polyorganosiloxanes participating in these compositions are generally composed of pairs based, on the one hand, on a linear, branched or crosslinked polysiloxane composed of (II') units in which the Z° residue represents a $C_2$-$C_6$ alkenyl group and where $x_1$ is at least equal to 1, optionally in combination with (I') units, and, on the other hand, on a linear, branched or crosslinked hydropolysiloxane composed of (II') units in which the Z° residue then represents a hydrogen atom and where $x_1$ is at least equal to 1, optionally in combination with (I') units.

Two-component or single-component polyorganosiloxane compositions which crosslink at ambient temperature (RTV) by polycondensation reactions under the effect of moisture, generally in the presence of a metal catalyst, for example a tin compound, are disclosed, for example for single-component compositions, in U.S. Pat. Nos. 3,065,194, 3,542,901, 3,779, 986 and 4,417,042 and in FR-A-2,638,752 and, for two-component compositions, in U.S. Pat. Nos. 3,678,002, 3,888, 815, 3,933,729 and 4,064,096. The polyorganosiloxanes included in these compositions are generally linear, branched or crosslinked polysiloxanes comprising (II') units in which the Z° residue is a hydroxyl group or a hydrolyzable atom or group and where $x_1$ is at least equal to 1, with the possibility of having at least one Z° residue which is equal to a hydroxyl group or to a hydrolyzable atom or group and at least one Z° residue which is equal to an alkenyl group when $x_1$ is equal to 2 or 3, said (II') units optionally being used in combination with (I') units. Such compositions can additionally comprise a crosslinking agent which is in particular a silane carrying at least three hydrolyzable groups, such as, for example, a silicate, an alkyltrialkoxysilane or an aminoalkyltrialkoxysilane.

These RTV organopolysiloxane compositions which crosslink by polyaddition or polycondensation reactions advantageously have a viscosity at 25° C. at most equal to 100,000 mPa·s and preferably of between 5,000 and 50,000 mPa·s.

It is possible to employ RTV compositions which crosslink at ambient temperature by polyaddition or polycondensation reactions having a viscosity at 25° C. of greater than 100,000 mPa·s, such as that within the range from a value of greater than 100,000 mPa·s to 300,000 mPa·s; this form is recommended when it is desired to prepare filler-comprising curable compositions in which the filler(s) used has (have) a tendency to separate by sedimentation.

It is also possible to employ compositions which crosslink under hot conditions by polyaddition reactions and more specifically polyaddition compositions said to be of HCE type having a viscosity at 25° C. at least equal to 500,000 mPa·s and preferably of between 1 million mPa·s and 10 million mPa·s and even more.

The compositions can also be compositions which can be cured at high temperature under the action of organic peroxides, such as 2,4-dichlorobenzoyl peroxide, benzoyl peroxide, t-butyl perbenzoate, cumyl peroxide or di(t-butyl) peroxide. The polyorganosiloxane or gum included in such compositions (referred to simply as of HCE type) is then composed essentially of (I') siloxyl units, optionally in combination with (II') units in which the $Z°$ residue represents a $C_2$-$C_6$ alkenyl group and where $x_1$ is equal to 1. Such HCEs are disclosed, for example, in U.S. Pat. Nos. 3,142,655, 3,821,140, 3,836,489 and 3,839,266. These compositions advantageously have a viscosity at 25° C. at least equal to 1 million mPa·s and preferably of between 2 million and 10 million mPa·s and even more.

Other polyorganosiloxane compositions which can be varnished by the silicone varnish composition according to the invention are those, single-component or two-component, which crosslink under hot conditions by polyaddition reactions, referred to as LSR compositions. These compositions correspond to the definitions given above with respect to the preferred compositions referred to as RTV compositions, except as regards the viscosity, which this time is within the range from a value of greater than 100,000 mPa·s to more than 500,000 mPa·s.

Without this being limiting, the silicone elastomer coatings on which the anti-soil varnish according to the invention can be applied are more especially coatings obtained from room temperature vulcanizable, RTV silicone elastomer compositions, in particular of two-component type (RTV 2), by polyaddition.

In order to further illustrate the present invention and the advantages thereof, the following specific examples are given, it being understood that same are intended only as illustrative and in nowise limitative. In said examples to follow, all parts and percentages are given by weight, unless otherwise indicated.

EXAMPLES

Tests

Resistance to Soiling:
Soiling Test:
Carbon black is deposited on the varnish coating and the ability of the support to be more or less easily cleaned is recorded on a scale of 0 to 5 (cf. single appended FIGURE):
0=remains black; 5=a few black marks remain As good wetting is the necessary condition for uniform coating by the varnish, this covering is assessed by an evaluation of the resistance to soiling which it introduces.

The resistance is the resistance to the deposition of a carbon black soiling substance; the reference chart shown in the single appended FIGURE serves for the grading. This FIGURE gives the scale of resistance to soiling: classification from 0 to 5, from the most to the least soiling.

Visual Appearance:
It is recorded whether the varnish confers a glossy or matte appearance.

Support:
1. The support sample is an RTV II coating applied to a polyester fabric.
This RTV II coating is prepared as follows:
40 kg of an α,ω-divinylated silicone oil with a viscosity of 1.5 Pa·s, which assays 0.1 meq of vinyl (Vi) per gram of oil, 0.24 kg of drinking water and 0.24 kg of hexamethyldisilazane are introduced into a 100 l arm mixer. After homogenizing, 13.9 kg of a combustion silica characterized by a specific surface of 200 $m^2/g$ are added portionwise over approximately 2 hours. After mixing for approximately 1 hour, 2.27 kg of hexamethyldisilazane are added over approximately 1 hour. 2 hours later, a heating phase is begun, during which the mixture is placed under a stream of nitrogen (30 $m^3/h$); the heating continues until approximately 140° C. is reached, which stationary temperature is maintained for 2 hours in order to remove the volatile materials from the composition. The suspension is then allowed to cool.

Starting from this suspension, a part A and a part B are formulated in appropriate reactors.

The part A comprises:
320 g of the suspension,
111 g of an α,ω-divinylated oil with a viscosity of 100 Pa·s which assays 0.03 meq Vi per gram of oil,
35 g of ground quartz with a mean particle size (d50) of approximately 2.5 μm,
12 g of a polyhydro oil with a viscosity of 0.3 Pa·s which assays 1.6 meq SiH per gram of oil,
12 g of an α,ω-dihydro oil which assays 1.9 meq SiH per gram of oil,
5 g of γ-methacryloyloxypropyltrimethoxysilane,
5 g of γ-glycidoxypropyltrimethoxysilane,
0.7 g of ethynylcyclohexanol.

The Part B Comprises:
480 g of the suspension,
20 g of butyl orthotitanate,
1.1 g of a Karstedt catalyst quantitatively determined at 10% of platinum.

The parts A and B are mixed in the ratio of 100 to 10 and, after removal of bubbles, the test specimens necessary for the measurement of the mechanical properties and of the adhesion properties are prepared.

The crosslinking on the support under consideration is carried out by leaving for 10 minutes in a ventilated oven maintained at 150° C.

The thickness of the coating is sufficient (approximately 300 μm) for the coated surface to be smooth and for the nature of the fabric used to become completely concealed.

2. The varnish is deposited using a Meyer rod; under these conditions, the amount deposited is of the order of 15-20 $g/m^2$. The combined product is subsequently introduced into an oven to bring about the drying and the crosslinking of the varnish.

Example 1

The following compositions are prepared:
Alkenylsilane A.1: Vinyltrimethoxysilane (VTMO),
Alkenylsilane A.2: Dynasilan® 6490 is a vinyltrimethoxysilane (VTMO) condensate sold by Degussa, Component B.1 of the catalytic system: DBTDA; dibutyltin diacetate,
Component B.2 of the catalytic system: TBOT; butyl titanate,
Ultrafine filler C: R812 is a treated pyrogenic silica sold by Degussa.

TABLE 1

| Reference | 1-1 | 1-2 | 1-3 |
|---|---|---|---|
| A.1- VTMO | 100 | — | — |
| A.2- Dynasilan ® 6490 | — | 100 | 100 |
| B.1- DBTDA | 2 | 2 | 2 |
| B.2- TBOT | 2 | 2 | 2 |
| C- Silica R812 | | | 2 |

The properties evaluated are combined in Table 2 below. It shows:
the advantage of the condensed silane in terms of gloss,
the reduced reactivity of this silane,
the necessary presence of silica in order to provide the wetting of the silicone support,
the good resistance to soiling in the case of the varnish 1-3.

TABLE 2

| | 1-1 | 1-2 | 1-3 |
|---|---|---|---|
| Wetting | Inadequate | Inadequate | Correct |
| Time for crosslinking | 1 min 120° C. | 3 min 120° C. | 3 min 120° C. |
| Appearance | Matt | Glossy | Glossy |
| Resistance to soiling | 1 | 1 | 3 |

Example 2

The following compositions are prepared in a stirred laboratory reactor with a capacity of 500 cm³ operating at ambient temperature and under enclosed conditions.
Alkenylsilane A.1: Vinyltrimethoxysilane (VTMO),
Alkenylsilane A.2: Dynasilan® 6490 is a vinyltrimethoxysilane (VTMO) condensate sold by Degussa,
Alkenylsilane A.3: hydrolyzate of A.1=A.1+ acid,
Component B.1 of the catalytic system: DBTDA; dibutyltin diacetate,
Component B.2 of the catalytic system: TBOT; butyl titanate,
Ultrafine filler C: R812 is a treated pyrogenic silica sold by Degussa,
Arylsilane D,
Thickening agent F: micronized polyamide C Super® is the CrayVallac® Super distributed by Cray Valley.

TABLE 3

| Reference | 2 |
|---|---|
| A.1- VTMO | 27.34 |
| A.2- Dynasilan ® 6490 | 2.66 |
| A.3- Hydrochloric acid, 10⁻²M | 10 |
| B.2- TBOT | 60 |
| B.1- Dibutyltin diacetate | 2 |
| C- Silica, R 812 | 0.2 |
| D- Phenyltrimethoxysilane | 1.75 |
| F- Thickening agent, C Super | 1 |

The hydrolyzis of the VTMO A.1 is first carried out by contact with the acid with stirring.

At the same time, the silica C and the thickening agent F C Super, are energetically dispersed in the alkenylsilane A.2, Dynasilan 6490.
The mixture is subsequently brought to completion.
As in example 1, the varnish 2 is deposited on the RTV II silicone coating.
The wetting of the support is good.
The viscosity measured is 15 mPa·s under a gradient of 100 s⁻¹.
The crosslinking is effective in 1 minute at 120° C.
The film produced has a glossy to satiny appearance.
The resistance to soiling lies between 3 and 4.

Each patent, patent application, publication and literature article/report cited or indicated herein is hereby expressly incorporated by reference.

While the invention has been described in terms of various specific and preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for varnishing a support substrate other than an architectural textile, the process comprising:
   (a) forming a top coat layer of a varnish composition onto a surface of a support substrate comprising a silicone or silicone elastomer, wherein the varnish composition comprises:
   A. at least one alkenylsilane;
   B. at least one catalytic system comprising:
      B/1 at least one organometallic condensation catalyst;
      B/2 at least one metal M chelate and/or at least one metal alkoxide of general formula $M(OJ)_n$, wherein n=valence of M, J=linear or branched $C_1$-$C_8$ alkyl radical, and M is selected from the group consisting of Ti, Zr, Ge and Al;
      wherein said catalyst system comprises B/2 or a combination of B1 and B/2;
   C. at least one ultrafine filler having a mean particle diameter of less than or equal to 0.5 μm;
   D. optionally, at least one arylsilane other than A;
   E. optionally, at least one other silane other than A and other than D;
   F. optionally, at least one thickening agent; and
   G. optionally, at least one functional additive, and
   (b) cross-linking the top coat layer of the varnish composition to form an outer layer of cross-linked varnish on said substrate,
      wherein the step of crosslinking the top-coat layer of said varnish composition to form an outer layer cross-linked varnish on said substrate comprises irradiating the surface of said support to which said varnish composition has been applied with infrared radiation.

2. The process as defined by claim 1, wherein forming a top coat layer of said varnish composition onto said surface of said support substrate comprises applying said varnish composition in an amount of less than or equal to 35 g/m².

3. The process as defined by claim 1, wherein forming a top coat layer of said varnish composition onto said surface of said support substrate comprises applying said varnish composition in an amount of less than or equal to 35 g/m².

4. The process as defined by claim 1, wherein the viscosity of the varnish composition forming the top coat layer has a dynamic viscosity η (expressed in mPas·s at 25° C.) of between 2 and 500, inclusive.

5. The process as defined by claim 1, wherein the varnish composition forming the top coat layer has a dynamic viscosity η (expressed in mPas·s at 25° C.) of between 5 and 200, inclusive.

6. The process as defined by claim 1, wherein the varnish composition forming the top coat layer has a dynamic viscosity η (expressed in mPas·s at 25° C.) of between 10 and 150, inclusive.

7. The process as defined by claim 1, wherein the at least one alkenylsilane is selected from the group consisting of:
  1. organoalkenylsilane monomer(s) comprising, per molecule, at least one alkenyl group;
  2. the oligomers or condensates of said monomer(s) 1.;
  3. the hydrolyzates obtained from said monomer(s) 1.; and
  4. mixtures thereof.

8. The process as defined by claim 7, wherein the organoalkenylsilane monomer is selected from the group consisting of vinyl alkoxysilanes, allylalkoxysilanes, (meth)acryloyloxy(alkoxy)silanes and an organoalkenylsilane monomer having the general formula:

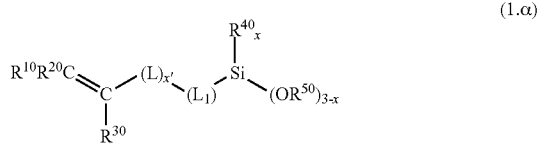

(1.α)

in which:
  the radicals $R^{10}$, $R^{20}$ and $R^{30}$, which may be identical or different, are each hydrogen, or a hydrocarbon radical;
  L is an alkylene radical;
  $L_1$ is a valency bond or oxygen;
  $R^{40}$ and $R^{50}$, which may be identical or different, are each an alkyl radical;
  x'=0 or 1; and
  x=0 to 2.

9. The process as defined by claim 1, wherein at least one of the following conditions (a)-(c) is met:
  (a) said at least one ultrafine filler having a mean particle diameter of less than or equal to 0.5 μm is selected from the group consisting of siliceous fillers which comprise silica powders, colloidal silicas, combustion and precipitated silicas, or mixtures thereof, suspensions of nanometric fillers, other inorganic fillers which comprise $TiO_2$, $Al_2O_3$ mica, and mixtures thereof;
  (b) said at least one arylsilane other than A is selected from the group consisting of phenyltrialkoxysilanes, phenylalkyldialkoxysilanes and mixtures thereof; and
  (c) said at least one other silane other than A and other than D is selected from the group of the functionalized silanes comprising, per molecule, one or more functional groups which are identical to or different from one another and which are selected from the group consisting of the following functional groups: hydroxyl, amino (primary, secondary or tertiary amine, optionally included in a ring or in isocyanurate groups or HALS groups of the piperidine or other type), epoxy, (meth)acrylo and ureido.

10. A process for varnishing an architectural textile, the process comprising:
  (a) forming a top coat layer of a varnish composition onto a surface of a support substrate comprising a silicone or silicone elastomer, wherein the varnish composition comprises:
    A. at least one alkenylsilane;
    B. at least one catalytic system comprising:
      B/1 at least one organometallic condensation catalyst;
      B/2 at least one metal M chelate and/or at least one metal alkoxide of general formula $M(OJ)_n$, wherein n=valence of M, J=linear or branched $C_1$-$C_8$ alkyl radical, and M is selected from the group consisting of Ti, Zr, Ge and Al;
      wherein said catalyst system comprises B/2 or a combination of B1 and B/2;
    C. at least one ultrafine filler having a mean particle diameter of less than or equal to 0.5 μm;
    D. optionally, at least one arylsilane other than A;
    E. optionally, at least one other silane other than A and other than D;
    F. optionally, at least one thickening agent; and
    G. optionally, at least one functional additive, and
  (b) cross-linking the top coat layer of the varnish composition to form an outer layer of cross-linked varnish on said substrate,
    wherein the step of crosslinking the top-coat layer of said varnish composition to form an outer layer cross-linked varnish on said substrate comprises irradiating the surface of said support to which said varnish composition has been applied with infrared radiation.

11. The process as defined by claim 10, wherein the varnish composition forming the top coat layer has a dynamic viscosity η (expressed in mPas·s at 25° C.) of between 2 and 500, inclusive.

12. The process as defined by claim 10, wherein the varnish composition forming the top coat layer has a dynamic viscosity η (expressed in mPas·s at 25° C.) of between 5 and 200, inclusive.

13. The process as defined by claim 10, wherein the varnish composition forming the top coat layer has a dynamic viscosity η (expressed in mPas·s at 25° C.) of between 10 and 150, inclusive.

14. The process as defined by claim 10, wherein the at least one alkenylsilane is selected from the group consisting of:
  1. organoalkenylsilane monomer(s) comprising, per molecule, at least one alkenyl group;
  2. the oligomers or condensates of said monomer(s) 1.;
  3. the hydrolyzates obtained from said monomer(s) 1.; and
  4. mixtures thereof.

15. The process as defined by claim 14, wherein the organoalkenylsilane monomer is selected from the group consisting of vinyl alkoxysilanes, allylalkoxysilanes, (meth)acryloyloxy(alkoxy)silanes and an organoalkenylsilane monomer having the general formula:

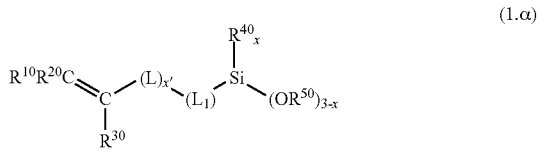

(1.α)

in which:
- the radicals $R^{10}$, $R^{20}$ and $R^{30}$, which may be identical or different, are each hydrogen, or a hydrocarbon radical;
- L is an alkylene radical;
- $L_1$ is a valency bond or oxygen;
- $R^{40}$ and $R^{50}$, which may be identical or different, are each an alkyl radical;
- x'=0 or 1; and
- x=0 to 2.

16. The process as defined by claim 14, wherein at least one of the following conditions (a)-(c) is met:
- (a) said at least one ultrafine filler having a mean particle diameter of less than or equal to 0.5 μm is selected from the group consisting of siliceous fillers which comprise silica powders, colloidal silicas, combustion and precipitated silicas, or mixtures thereof, suspensions of nanometric fillers, other inorganic fillers which comprise $TiO_2$, $Al_2O_3$ mica, and mixtures thereof;
- (b) said at least one arylsilane other than A is selected from the group consisting of phenyltrialkoxysilanes, phenylalkyldialkoxysilanes and mixtures thereof; and
- (c) said at least one other silane other than A and other than D is selected from the group of the functionalized silanes comprising, per molecule, one or more functional groups which are identical to or different from one another and which are selected from the group consisting of the following functional groups: hydroxyl, amino (primary, secondary or tertiary amine, optionally included in a ring or in isocyanurate groups or HALS groups of the piperidine or other type), epoxy, (meth) acrylo and ureido.

* * * * *